United States Patent
Xu et al.

(10) Patent No.: US 9,518,179 B2
(45) Date of Patent: Dec. 13, 2016

(54) MODIFIER COMPOSITION FOR POLYOLEFIN, POLYOLEFIN FOR PACKAGING AND FLEXIBLE PACKAGING FILM

(75) Inventors: Wencai Xu, Beijing (CN); Dongli Li, Beijing (CN); Yabo Fu, Beijing (CN)

(73) Assignee: Beijing Institute of Graphic Communication, Daxing District Beijing (CN)

( * ) Notice: Subject to any disclaimer, the term of this patent is extended or adjusted under 35 U.S.C. 154(b) by 580 days.

(21) Appl. No.: 14/111,594

(22) PCT Filed: Apr. 14, 2011

(86) PCT No.: PCT/CN2011/072780
§ 371 (c)(1),
(2), (4) Date: Oct. 14, 2013

(87) PCT Pub. No.: WO2012/139292
PCT Pub. Date: Oct. 18, 2012

(65) Prior Publication Data
US 2014/0037972 A1 Feb. 6, 2014

(51) Int. Cl.
| | | |
|---|---|---|
| *C08L 31/04* | (2006.01) |
| *B65D 65/40* | (2006.01) |
| *C08L 23/08* | (2006.01) |
| *C08L 23/12* | (2006.01) |
| *C08L 23/14* | (2006.01) |
| *C08F 220/06* | (2006.01) |
| *C08F 220/14* | (2006.01) |

(52) U.S. Cl.
CPC .............. *C08L 31/04* (2013.01); *B65D 65/40* (2013.01); *C08L 23/0815* (2013.01); *C08L 23/0853* (2013.01); *C08L 23/12* (2013.01); *C08L 23/14* (2013.01); *C08F 220/06* (2013.01); *C08F 220/14* (2013.01); *C08L 2203/16* (2013.01); *C08L 2205/035* (2013.01); *C08L 2310/00* (2013.01); *Y10T 428/31667* (2015.04)

(58) Field of Classification Search
None
See application file for complete search history.

(56) References Cited

U.S. PATENT DOCUMENTS

| | | | | |
|---|---|---|---|---|
| 4,037,004 A * | 7/1977 | Nakano | ................. | B41M 5/128 |
| | | | | 427/145 |
| 4,124,562 A | 11/1978 | Yui et al. | | |
| 5,489,638 A * | 2/1996 | Burdick | ..................... | C08J 3/03 |
| | | | | 162/164.1 |
| 6,448,330 B1 * | 9/2002 | Inoue | ........................ | C08F 2/24 |
| | | | | 524/803 |
| 2001/0036552 A1* | 11/2001 | Otani | ..................... | B41M 5/502 |
| | | | | 428/411.1 |
| 2001/0050291 A1* | 12/2001 | Jud | ........................ | B65D 35/12 |
| | | | | 222/107 |

FOREIGN PATENT DOCUMENTS

| | | | | |
|---|---|---|---|---|
| CN | 101258870 | | 9/2008 | |
| CN | 101724176 | | 6/2010 | |
| CN | 101724176 A | * | 6/2010 | |
| JP | S564563 | | 1/1981 | |
| JP | WO 2011065382 A1 | * | 6/2011 | ............ C08F 220/18 |

OTHER PUBLICATIONS

Machine translation of CN 101724176 A (2010).*

* cited by examiner

*Primary Examiner* — Alexandre Ferre
(74) *Attorney, Agent, or Firm* — McAfee & Taft A Professional Corporation

(57) ABSTRACT

The disclosure relates to a modifier composition for polyolefin, a polyolefin for packaging and a flexible packaging film. The disclosure relates to a modifier composition for polyolefin, including: (A) nano-silicon dioxide; (B) polyvinyl alcohol; (C) acrylic copolymer; and (D) Ethylene-Vinyl Acetate (EVA) copolymer. The disclosure also relates to a polyolefin for packaging, including: a polyolefin resin and a modifier composition of the polyolefin provided by the disclosure. The disclosure also relates to a flexible packaging film, of which at least a part is made of the polyolefin for packaging of the disclosure. The modifier composition of the disclosure can obviously improve the performance in the aspect of reducing residue of solvent in the polyolefin flexible packaging film.

17 Claims, No Drawings

MODIFIER COMPOSITION FOR POLYOLEFIN, POLYOLEFIN FOR PACKAGING AND FLEXIBLE PACKAGING FILM

TECHNICAL FIELD OF THE APPLICATION

The disclosure relates to a modifier composition for polyolefin, a polyolefin for packaging and a flexible packaging film, and in particular to a modifier composition for polyolefin for food packaging, a polyolefin for food packaging and a flexible food packaging film.

BACKGROUND OF THE APPLICATION

The small molecule chemical residues (or solvent residues) in the packaging materials seriously endanger the health of consumers, which cause the attention of the food safety management organizations of the countries around the world; so, the development of the food packaging materials which remains the low amount of small molecule chemical residues has become a research focus of the scholars from various countries.

In recent years, the accidents of food contamination caused by the packaging materials have occasionally occurred; the main reason of causing food contamination is the small molecule chemicals which exist in the packaging materials; the small molecule chemical pollutants can be organic solvents, initiators, plastic processing aids and the like in printing inks or binders. The odor of the packaging materials is one of the main reasons of causing food contamination; and the odor is mainly generated by the organic solvents. One of the main sources of the organic solvents is the solvent-based inks used when producing the flexible package; ethyl acetate is the main solvent of the solvent-based inks; a large part of the flexible packages are produced by adopting the dry laminating process at present; a solvent-based polyurethane binder is required in the production process, and such polyurethane binder uses toluene, ethyl acetate and the like as the organic solvents. However, due to the performance of the materials used in the flexible packaging materials, the solvents will not volatize in a timely manner when passing through a drying oven. The Low Density Polyethylene (LDPE) film and the Casting Polypropylene (CPP) film have heat-sealing properties; the Biaxially Oriented Polypropylene (BOPP) film has relatively excellent transparency, high gloss and printing performance; and as the polyolefin films are low in cost, the consumption of the polyolefin films used in the flexible packaging materials is more than 50%. Recently, almost all of the flexible packages are multi-layer laminated films and are implemented with color printing, thus causing the food safety hazards.

The principle of "like dissolves like" is a general rule shown by the polymer material when being dissolved in the organic solvents, and this principle is also suitable for the solvent residue phenomenon caused by the packaging materials absorbing the organic solvents. As known to all, the solubility parameters ($\delta$) of the Polyethylene (PE) and the Polypropylene (PP) flexible packaging materials are respectively 18.9 and 16.4 $(J/cm^3)^{1/2}$; the solubility parameters of the two organic solvents, namely, the ethyl acetate and toluene, are respectively 18.6 and 18.2 $(J/cm^3)^{1/2}$; the solubility parameters of the PE and PP materials films are quite similar with the solubility parameters of the two general organic solvents, namely, the ethyl acetate and toluene; therefore, the toluene and ethyl acetate must have a relatively high solubility in the polyolefin flexible packaging materials, namely, the polyolefin films have quite high absorbability to the organic solvents, and can absorb a large number of organic solvents; compared with the Polyethylene Terephthalate (PET) ($\delta$=21.9) with relatively high polarity, the flexible packaging materials which contain the polyolefin films are easier to cause excessive solvent residue; and this is proved by the practices of the flexible package manufacturing factory; this fact can be explained as there is a large difference between the solubility parameters of the PET materials and the solubility parameters of toluene and ethyl acetate.

Many scholars have researched a large number of qualitative and quantitative detection methods for the organic solvent residues in the packaging materials; however, the problems that which processing technology can be adopted to reduce the solvent residues in the packaging materials, and what structure of the PE and PP films have small solubility to the organic solvents are seldom researched. At present, the flexible package manufacturing enterprises reduce the solvent residues of the flexible packaging products by changing the drying conditions, adjusting the printing or lamination speed, changing the printing technologies and the like; the flexible packaging materials with excessive solvent residue value can be remedied via the methods of ventilating, increasing curing time, increasing the rewinding times and the like; however, the methods used for reducing the solvent residues of the packaging materials are passive; once adopting the PE and PP packaging materials, and the solvents such as toluene and ethyl acetate, the problems of solvent residue will be always existent, and this is an inevitable result caused by the "like dissolves like" principle.

The consumption of the packaging materials is increased at a rate of about 10% every year around the world, the consumption of the PE and PP resins for packaging is increased accordingly; however, the problem that the polyolefin film has a relatively high solvent residue value always cannot be solved by the flexible packaging manufacturing enterprises. In order to enhance the food safety, each of the countries has issued more serious standards of limiting the solvent residues, which sets a higher "threshold" for the flexible package enterprises.

Recently, food contamination accidents have been caused by small molecule chemicals remaining in the package. Such contamination endangers the health of consumers and may cause economic loss to the manufacturers. Thus, the work of researching the residue mechanism of the organic solvents in the polyolefin, researching what polyolefin with the suitable aggregation structure has relatively low toluene and ethyl acetate absorbability, and researching which processing technology can be adopted to prepare the flexible packaging materials, which have low solvent residues and can better satisfy the food safety requirements, has very important theoretical significance and practical application value.

In the field of printing and packaging, the PE and PP films have lots of problems during the use, for example, poor printing performance, low peeling strength of the laminated films, higher solvent residue vale and the like; aiming at the above problems, the Chinese patent application 200810171239.X (Publication No. CN101724176A) discloses a polyolefin processing aid for food flexible packaging, a preparation method thereof, the use, and a polyolefin modified by the processing aid, and discloses a nano-silicon dioxide/Ethylene-Vinyl Acetate (EVA) polyolefin modification additive. In the Chinese patent application No.

200910176114.0 and 200910176112.1, the PP flexible packaging materials and the PE flexible packaging materials modified by the above silicon dioxide/EVA are respectively adopted.

However, the existing processing aids need to be further improved in the aspect of reducing the solvent residues.

SUMMARY OF THE APPLICATION

The disclosure relates to a modifier composition for polyolefin, including: (A) nano-silicon dioxide;
(B) polyvinyl alcohol;
(C) acrylic copolymer; and
(D) EVA copolymer.

Preferably, the modifier composition for polyolefin according to the disclosure includes:
(A) nano-silicon dioxide, which is 10-50 parts by weight, preferably 15-50 parts by weight, more preferably 19-50 parts by weight, and most preferably 19-47 parts by weight;
(B) polyvinyl alcohol, which is 1-5 parts by weight, preferably 1.5-5 parts by weight, more preferably 1.5-4 parts by weight, and most preferably 1.5-3.7 parts by weight;
(C) acrylic copolymer, which is 2-15 parts by weight, preferably 3-15 parts by weight, more preferably 3.9-15 parts by weight, and most preferably 3.9-12.2 parts by weight; and
(D) EVA copolymer, which is 45-75 parts by weight, preferably 45-74 parts by weight, and more preferably 47-73.5 parts by weight.

Preferably, the degree of polymerization of the (B) polyvinyl alcohol is 1500-2000, and the alcoholysis degree of the (B) polyvinyl alcohol is greater than or equal to 98%.

Preferably, the content of vinyl acetate in the (D) EVA copolymer is 70%-95% by weight.

Preferably, the (C) acrylic copolymer is a copolymer of (meth) acrylic ester and (meth) acrylic acid (salt).

Preferably, the degree of polymerization of the (C) acrylic copolymer is 150-200, and the monomer molar content of the (meth) acrylic acid (salt) is 10%-30%.

Preferably, the (meth) acrylic ester is (meth) acrylic acid alkyl ester, for example, (meth) acrylic acid $C_{1-15}$ alkyl ester, preferably (meth) acrylic acid $C_{1-10}$ alkyl ester, more preferably (meth) acrylic acid $C_{1-8}$ alkyl ester, and most preferably (meth) acrylic acid $C_{1-6}$ alkyl ester.

Preferably, the (meth) acrylic ester is selected from one or the mixture of at least two of: methyl acrylate, ethyl acrylate, propyl acrylate, butyl acrylate, pentyl acrylate, hexyl acrylate, acrylate-2-ethyl hexyl ester, methyl methacrylate, ethyl methacrylate, propyl methacrylate, butyl methacrylate, pentyl methacrylate, hexyl methacrylate, methacrylate-2-ethyl hexyl ester.

Preferably, the (meth) acrylic acid (salt) is selected from acrylic acid, methacrylic acid or the salts thereof, or the mixture of at least two thereof, preferably, the salt is alkali metal salts, and particularly preferably, the salt is sodium salt and/or potassium salt.

The disclosure also relates to a polyolefin for packaging, including:
a polyolefin resin; and
the modifier composition of the polyolefin according to the disclosure.

Preferably, the polyolefin resin is selected from PE, PP and the blends of PE and PP.

Preferably, the PE is selected from High Density PE (HDPE) and LDPE, for example, Linear Low Density PE (LLDPE).

Preferably, in each 100 parts of the polyolefin resin by weight, the additive amount of the modifier composition of the polyolefin is 0.5-5 parts by weight.

Preferably, when the crystallinity of the polyolefin resin is greater than or equal to 90%, in each 100 parts of the polyolefin resin by weight, the dosage of the modifier composition of the polyolefin is 0.5-1.0 part by weight.

The disclosure also relates to a flexible packaging film, at least a part of which is made of the polyolefin for packaging according to the disclosure.

Preferably, the flexible packaging film is a multi-layer laminated flexible packaging film, preferably, a three-layer composite flexible packaging film.

Preferably, the multi-layer laminated flexible packaging film includes a BOPP film, a CPP film and a multi-layer co-extrusion PE film.

Preferably, the multi-layer laminated flexible packaging film includes at least three layers of structures:
an upper layer;
at least one core layer; and
a lower layer;
wherein, at least one of the upper layer and the lower layer is made of the polyolefin for packaging.

The modifier composition of the disclosure can obviously improve the performance in the aspect of reducing residue of the solvent in the polyolefin flexible packaging film.

DETAILED DESCRIPTION OF THE EMBODIMENTS

In the disclosure, all the embodiments, implementation modes and characteristics of the disclosure can be mutually combined in the case of no contradiction or conflict.

In the disclosure, the terminology "(meth) acrylic acid (salt)" represents (meth) acrylic acid and/or (meth)acrylate.

In the disclosure, the terminology "(meth) acrylic ester-(meth) acrylic acid (salt) copolymer" represents the copolymer of (meth) acrylic ester and (meth) acrylic acid and/or the copolymer of (meth) acrylic ester and (meth)acrylate.

In the disclosure, the terminology "modifier composition for polyolefin" represents the modifier composition used for polyolefin, namely, the modifier composition for modifying polyolefin.

In the disclosure, the terminologies "mass" and "weight" can be interchanged, both have the same meaning, representing "mass", and the unit can be kg, g and the like.

(I) Modifier Composition

The inventor has unexpectedly found that, compared with the silicon dioxide/EVA binary modifier composition, the modifier composition (especially the nano-modifier composition) obtained by combining the polyvinyl alcohol, acrylic copolymer and EVA copolymer with the nano-silicon dioxide can obviously improve the performance in the aspect of reducing the residue of the solvent in the polyolefin flexible packaging film.

One aspect of the disclosure relates to a modifier composition for polyolefin, and in particular to a modifier composition for polyolefin for food packaging. Preferably, the modifier composition of the disclosure is a nano-modifier composition.

The composition of the disclosure includes:
(A) nano-silicon dioxide;
(B) polyvinyl alcohol;
(C) acrylic copolymer; and
(D) EVA copolymer.

In a preferred embodiment, the modifier composition of the disclosure includes:

(A) nano-silicon dioxide, which is 10-50 parts by weight, preferably 15-50 parts by weight, more preferably 19-50 parts by weight, and most preferably 19-47 parts by weight;

(B) polyvinyl alcohol, which is 1-5 parts by weight, preferably 1.5-5 parts by weight, more preferably 1.5-4 parts by weight, and most preferably 1.5-3.7 parts by weight;

(C) acrylic copolymer, which is 2-15 parts by weight, preferably 3-15 parts by weight, more preferably 3.9-15 parts by weight, and most preferably 3.9-12.2 parts by weight; and (D) EVA copolymer, which is 45-75 parts by weight, preferably 45-74 parts by weight, and more preferably 47-73.5 parts by weight.

In a preferred embodiment, the modifier composition of the disclosure includes:

(A) nano-silicon dioxide, which is 10-50% of the total weight of the composition, preferably 15-50%, more preferably 19-50%, and most preferably 19-47%;

(B) polyvinyl alcohol, which is 1-5% of the total weight of the modifier composition for polyolefin, preferably 1.5-5%, more preferably 1.5-4%, and most preferably 1.5-3.7%;

(C) acrylic copolymer, which is 2-15% of the total weight of the modifier composition for polyolefin, preferably 3-15%, more preferably 3.9-15%, and most preferably 3.9-12.2%; and (D) EVA copolymer, which is 45-75% of the total weight of the modifier composition for polyolefin, preferably 45-74%, and more preferably 47-73.5%.

Each component is described below in details.

(A) Nano-Silicon Dioxide

Preferably, the amount of (A) nano-silicon dioxide can be 10-50 parts by weight, preferably 15-50 parts by weight, more preferably 19-50 parts by weight, and most preferably 19-47 parts by weight, for example, 19 parts by weight, 27 parts by weight, 36 parts by weight, 47 parts by weight.

Based on the total weight of the composition, the amount of (A) nano-silicon dioxide can be 10-50%, preferably 15-50%, more preferably 19-50%, and most preferably 19-47%, for example, 19%, 27%, 36%, 47%.

(B) Polyvinyl Alcohol

Preferably, the amount of (B) polyvinyl alcohol can be 1-5 parts by weight, preferably 1.5-5 parts by weight, more preferably 1.5-4 parts by weight, and most preferably 1.5-3.7 parts by weight.

Based on the total weight of the composition, the amount of (B) polyvinyl alcohol can be 1-5%, preferably 1.5-5%, more preferably 1.5-4%, and most preferably 1.5-3.7%.

Preferably, the degree of polymerization of polyvinyl alcohol is 1500-2000, and the alcoholysis degree is greater than or equal to 98%.

(C) Acrylic Copolymer

Preferably, the amount of (C) acrylic copolymer can be 2-15 parts by weight, preferably 3-15 parts by weight, more preferably 3.9-15 parts by weight, and most preferably 3.9-12.2 parts by weight.

Preferably, based on the total weight of the composition, the amount of (C) acrylic copolymer can be 2-15%, preferably 3-15%, more preferably 3.9-15%, and most preferably 3.9-12.2%.

Preferably, the acrylic copolymer is the copolymer of (meth) acrylic ester and (meth) acrylic acid and/or (meth) acrylate ((meth) acrylic ester-(meth) acrylic acid (salt) copolymer for short).

Preferably, the degree of polymerization of the (meth) acrylic ester-(meth) acrylic acid (salt) copolymer is 150-200, and the monomer molar content of the (meth) acrylic acid (salt) is 10%-30%.

The (meth) acrylic ester can be (meth) acrylic acid alkyl ester, for example, (meth) acrylic acid $C_{1-15}$ alkyl ester, preferably (meth) acrylic acid $C_{1-10}$ alkyl ester, more preferably (meth) acrylic acid $C_{1-8}$ alkyl ester, and most preferably (meth) acrylic acid $C_{1-6}$ alkyl ester.

Preferably, the (meth) acrylic ester is selected from one or the mixture of at least two of: methyl acrylate, ethyl acrylate, propyl acrylate, butyl acrylate, pentyl acrylate, hexyl acrylate, acrylate-2-ethyl hexyl ester, methyl methacrylate, ethyl methacrylate, propyl methacrylate, butyl methacrylate, pentyl methacrylate, hexyl methacrylate, methacrylate-2-ethyl hexyl ester. Preferably, the (meth) acrylic ester is selected from one or the mixture of at least two of: methyl acrylate, ethyl acrylate, butyl acrylate, acrylate-2-ethyl hexyl ester, methyl methacrylate, ethyl methacrylate, butyl methacrylate, methacrylate-2-ethyl hexyl ester.

Preferably, the (meth) acrylic acid (salt) is selected from acrylic acid, methacrylic acid or the salts thereof, or the mixture of at least two thereof, preferably, the salt is alkali metal salts, and preferably, the salt is lithium salt, sodium salt and/or potassium salt.

(D) EVA Copolymer

Preferably, the amount of the (D) EVA copolymer can be 45-75 parts by weight, preferably 45-74 parts by weight, more preferably 47-73.5 parts by weight, for example, 47, 50, 54, 60, 62, 63, 66, 73 parts by weight.

Preferably, based on the total weight of the composition, the amount of (D) EVA copolymer can be 45-75%, preferably 45-74%, more preferably 47-73.5%, for example, 47%, 50%, 54%, 60%, 62%, 63%, 66%, 73%. The amount of (D) EVA copolymer can be 45-85%, preferably 45-80%.

Preferably, the content of Vinyl Acetate (VA) in the EVA copolymer is 70%-95% by weight, preferably 70%-90%, and more preferably 70%-85%.

The disclosure also relates to a preparation method of the above modifier composition, including the following steps:

(a) providing an aqueous solution of the (B) polyvinyl alcohol;

(b) sequentially adding the (C) acrylic copolymer emulsion and (D) EVA copolymer emulsion, and mixing uniformly;

(c) adding acid, and then adding alkyl ester orthosilicate to make the alkyl ester orthosilicate be hydrolyzed;

(d) drying and granulating the products obtained in Step (c), to obtain the modifier composition.

The alkyl ester orthosilicate can be the alkyl ester orthosilicate which generates silicon dioxide via hydrolysis. For example, the alkyl ester orthosilicate can be tetramethoxysilane, Tetraethyl Orthosilicate (TEOS), tetrapropoxysilane, and preferably TEOS.

In a preferred embodiment, the preparation method of the modifier composition is as follows: adding deionized water and polyvinyl alcohol in a reaction kettle, heating to guarantee that the polyvinyl alcohol is completely dissolved; and then sequentially adding (meth) acrylic ester emulsion and the EVA copolymer emulsion; adding a certain concentration of hydrochloric acid to the system after uniformly mixing the emulsion, and then dropping the TEOS, keeping under 55 degrees centigrade to make the TEOS be hydrolyzed; drying and granulating the products to obtain the modifier composition.

(II) Polyolefin for Packaging

The disclosure also relates to a modified polyolefin for packaging, including: a polyolefin resin; and the modifier composition of the disclosure.

Preferably, the polyolefin resin is selected from PE, PP and the blends of PE and PP.

Preferably, the PE is selected from HDPE and LDPE, for example, an LLDPE.

Preferably, in each 100 parts of the polyolefin resin by weight, the additive amount of the modifier composition for the polyolefin is 0.5-5 parts by weight.

Preferably, when the crystallinity of the polyolefin resin is greater than or equal to 90%, in each 100 parts of the polyolefin resin by weight, the dosage of the modifier composition of the polyolefin is 0.5-1.0 part by weight.

Preferably, when the crystallinity of the polyolefin resin is less than or equal to 30%, in each 100 parts of the polyolefin resin by weight, the additive amount of the modifier composition of the polyolefin is 0.5-5 parts by weight.

More preferably, the polyolefin for packaging further includes one or more aids below: antioxidants, lubricants and plasticizers.

Further preferably, the antioxidant is selected from an antioxidant 1010, an antioxidant 168; the lubricant is selected from zinc stearate and/or calcium stearate, the plasticizer is a citrate plasticizer.

Further preferably, the lubricant is the calcium stearate lubricant.

The preparation method of the polyolefin for packaging of the disclosure can include the following steps: melting and blending the modifier composition which is prepared above and the raw material of polyolefin resin to obtain the polyolefin for packaging.

The polyolefin for packaging which is modified by the nano-aid of the disclosure is particularly suitable for being used as the polyolefin material for food flexible packaging.

(III) Flexible Packaging Film

The disclosure also relates to a flexible packaging film, at least a part of which is prepared by the polyolefin for packaging of the disclosure.

Preferably, the flexible packaging film is a multi-layer laminated flexible packaging film, preferably, a three-layer composite flexible packaging film.

Preferably, the multi-layer laminated flexible packaging film includes a BOPP film, a CPP film and a multi-layer co-extrusion PE film.

Preferably, the multi-layer laminated flexible packaging film includes at least three layers of structures:
an upper layer;
at least one core layer; and
a lower layer;
wherein, at least one of the upper layer and the lower layer is made of the polyolefin for packaging of the disclosure.

Preferably, the multi-layer laminated flexible packaging film includes a three-layer structure: an upper layer, a core layer and a lower layer; wherein, at least one of the upper layer and the lower layer is made of the polyolefin for packaging of the disclosure.

The preparation method of the flexible packaging film of the disclosure can be that: the polyolefin for packaging of the disclosure can be processed to be the film by adopting a blown film or cast film processing method.

In a preferred embodiment, the preparation method of the nano-modified polyolefin film includes the following steps: after uniformly mixing the modifier composition which is prepared above and the raw material of polyolefin resin, melting and blending the mixture by using a common double-screw extruder under 150-220 degrees centigrade, to obtain the nano-modified resin; and then using the common blowing film or casting film processing device to process the above nano-modified resin to be the film, testing the solvent residue indicators of the film.

The principle of "like dissolves like" is a general rule shown by the polymer material when being dissolved in the organic solvents, and this principle is also suitable for the solvent residue phenomenon caused by the packaging materials absorbing the organic solvents. As known to all, the solubility parameters of the PE and the PP flexible packaging materials are quite similar with the solubility parameters of the two organic solvents, namely, the ethyl acetate and toluene, therefore, the toluene and ethyl acetate must have a relatively high solubility in the polyolefin flexible packaging materials, namely, the polyolefin films have quite high absorbability to the organic solvents, and can absorb a large number of organic solvents, thus causing food contamination. If adding a processing aid with high polarity (relatively high solubility parameter) to modify the polyolefin, the solubility parameter of the modified polyolefin can be increased, thus, the difference of the solubility parameters between the modified polyolefin and the toluene and ethyl acetate must be increased, so that the solubility or absorbability of the toluene and ethyl acetate in the modified polyolefin can be weakened, thus reducing the residue of the organic solvents in the packaging materials.

The polymer is firstly swelled in the organic solvent before being dissolved, the organic solvent enters among the polymer molecular chains, thus destroying the Van der Waals force among the polymer molecular chains, and making the polymer be swelled; the diffusion process of the organic solvent and the swelling process of the polymer are affected by the aggregation state of the polymer. The organic solvent can hardly enter into the crystallization area of the polymer under room temperature, but the amorphous region of the polymer can easily absorb the organic solvent or can be swelled by the organic solvent. So, another method of reducing the organic solvent residues in the packaging materials is to improve the crystallinity of the polymer as much as possible, and to reduce the amorphous structures of the aggregation state.

As the nano-silicon dioxide, polyvinyl alcohol, (meth) acrylic acid (salt) copolymer have high polarity, after being modified thereby, the solubility parameter of polyolefin can be increased, the compatibility on the polyolefin film acted by the toluene and ethyl acetate can be reduced, and the solubility or absorbability to the organic solvents acted by the film can be decreased; in the polyolefin films, the heterogeneous nucleation effect of silicon dioxide, polyvinyl alcohol and (meth) acrylic acid (salt) copolymer can improve the recrystallization temperature of the polyolefin, and can improve the crystallization rate of the polyolefin; this is beneficial for improving the crystallinity of the polymer, and for reducing the solubility or absorbability to the organic solvents acted by the polyolefin; thus, using the process route of modifying the polyolefin by the nano-silicon dioxide composition, perfectly combining the high polarity and heterogeneous nucleation performance of the silicon dioxide and the like, adopting the "like dissolves like" principle and "swelling-dissolving" principle in the polymer dissolving process, so as to provide a new process route of preparing the packaging materials with low solvent residues.

In order to give fully play to the effect of nano-silicon dioxide, polyvinyl alcohol, and (meth) acrylic acid (salt) copolymer, the high-polarity substances such as nano-silicon dioxide and the like are required of nano-level diffusion in the polyolefin matrix, especially the nano-silicon dioxide, which is easy to be agglomerated; thus, a separant needs to be added to prevent the silicon dioxide from agglomerating when preparing the nano-silicon dioxide composition, and meanwhile, a dispersant (compatibilizer) which has excellent compatibility with the polyolefin also needs to be added. However, the separant and compatibilizer can cut off the rearrangement of the polyolefin molecular chains, so as to reduce the arrangement orderliness of the polyolefin molecular chains, to decrease the crystallinity and rise the concentration of the solvent solvents. Therefore, in the nano-silicon dioxide composition, the content of the separant or dispersant cannot be too high, or too low, otherwise, the nano-silicon dioxide can be agglomerated, and the high-polarity substances cannot be dispersed well in the polyolefin matrix. In the disclosure, the separant and dispersant are EVA resins (EVA copolymer).

In the nano-silicon dioxide composition, the nano-silicon dioxide accounts for 10-50%, the polyvinyl alcohol (of which the degree of polymerization is 1500-2000, and the alcoholysis degree is greater than or equal to 98%) accounts for 1-5%, the (meth) acrylic ester-(meth) acrylic acid (salt) copolymer (of which the degree of polymerization is 150-200, and the monomer molar content of (meth) acrylic acid (salt) is 10-30%) accounts for 2-15%, the EVA copolymer (of which the VA content is 70-95%) accounts for 45-75%.

To the raw materials of flexible packaging resin with poor crystallization capacity, the nano-modified process route provided by the disclosure not only improves the solubility parameter of the modified polyolefin, but also improves the crystallinity thereof, both can reduce the solvent residues of the nano-modified flexible packaging materials, With the dosage of 0.5-5.0% of nano-silicon dioxide modifier, the toluene residue of the nano-modified LDPE film is decreased by 50%-97%, and the residue of ethyl acetate is decreased by 60%-90%.

To the raw materials of flexible packaging resins with high crystallization capacity (the crystallinity is greater than 90%), although the modification process route provided by the disclosure can improve the solubility parameter of the modified polyolefin, under the separation effect of the separant and dispersant to the rearrangement of the polyolefin molecular chains, the crystallinity of the modified polyolefin packaging material can be reduced. In spite of this, the solvent residues of the polyolefin which is modified by the nano-silicon dioxide still can be decreased greatly. With the dosage of 0.5-5.0% of nano-silicon dioxide modifier, the toluene residue of the CPP film is decreased by 40%-75%, and the residue of ethyl acetate is decreased by 60%-99%.

Technique Features of the Application

In order to guarantee the health of consumers, the limit of the solvent residues of the packaging materials will be more and more strict. As the food flexible packaging materials, the PE and PP films are quite easy to absorb the organic solvents, such as toluene and ethyl acetate and the like, to cause excessive solvent residues of the compound flexible packaging films; at present, the solvent residues of the PE or PP composite films can be reduced only via the passive methods of rising the temperature of the drying channel, increasing the air volume of the drying channel, increasing the rewinding times, prolonging the curing time and the like; this application discloses the modified PE, PP resin prepared by the nano-modified process, and the composite film prepared by the modified polyolefin, of which the solvent residue value can be reduced by 40% and more; the process route of preparing the polyolefin flexible packaging materials with low solvent residues has no other report.

The modifier composition used for the nano-modified process of the disclosure includes nano-silicon dioxide, polyvinyl alcohol, (meth) acrylic acid (salt) copolymer and EVA resins, wherein the nano-silicon dioxide accounts for 10-50%, the polyvinyl alcohol (of which the degree of polymerization is 1500-2000, and the alcoholysis degree is greater than or equal to 98%) accounts for 1-5%; the (meth) acrylic ester-(meth) acrylic acid (salt) copolymer (of which the degree of polymerization is 150-200, the monomer molar content of the (meth) acrylic acid (salt) is 10-30%) accounts for 2-15%, the EVA copolymer (of which the VA content is 70-95%) accounts for 45-75%; the additive amount of the modifier in the polyolefin takes is 0.5-5% of the polyolefin resin.

The high polarity and heterogeneous nucleation performance of the nano-silicon dioxide, polyvinyl alcohol and (meth) acrylic acid (salt) copolymer not only can improve the solubility parameter of the modified resins, but also can improve the crystallinity of the modified polyolefin; both effects are beneficial for reducing the solvent residues. Although the EVA resin in the modifier composition causes the crystallinity of the polyolefin to be decreased, the separation and dispersibility of the EVA in the modifier are very important.

The disclosure claims a new nano-silicon dioxide composition, mainly aiming at changing the solvent absorption performance of the polyolefin. In the composition, the nano-silicon dioxide accounts for 10-50%, the polyvinyl alcohol (of which the degree of polymerization is 1500-2000, and the alcoholysis degree is greater than or equal to 98%) accounts for 1-5%; the (meth) acrylic ester-(meth) acrylic acid (salt) copolymer (of which the degree of polymerization is 150-200, the monomer molar content of the (meth) acrylic acid (salt) is 10-30%) accounts for 2-15%, the EVA copolymer (of which the VA content is 70-95%) accounts for 45-75%.

The disclosure adopts the organic silicon hydrolysis method to prepare nano-silicon dioxide, uses the acrylic copolymer, the polyvinyl alcohol and the EVA as the compatibilizer and separant; compared with the Chinese patent application 200810171239.X (Publication No. CN101724176A), the silicon dioxide particles prepared by the disclosure are more uniform and have smaller particle size.

The polyolefin modified by the nano-silicon dioxide composition has a very low solvent residue value; the test proves that the organic solvent residues of the packaging materials can be reduced via the nano-modified process; via the analysis of the micro-structure of the nano-modified polyolefin, we can obtain that packaging material with what kind of crystallization structure has weaker absorbability to the organic solvents, and also can obtain the mechanism of reducing the solvent residue of the packaging materials via the nano-modified process. The nano-modified polyolefin is used for preparing the multi-layer co-extrusion films, for example, the BOPP films, the CPP films and the multi-layer co-extrusion PE films; the films generally include a three-layer structure: an upper layer, a core layer and a lower layer; in order to reduce the production cost, the core layers of the multi-layer co-extrusion films adopt the unmodified common resins; the upper and lower layers of the film or one layer thereof adopts/adopts the modified resin; the upper and lower sides of the core layer are generally the printing layer or the binder contact surface; as the organic solvent may be contacted in the production process, the layers need to be prepared by the modified resins.

Embodiments

Five processing aids NS-1, NS-2, NS-3, NS-4 and NS-5 for the polyolefin are provided in the embodiments of the disclosure, and of which the raw material formulations and the components of the final nano-modifier composition are shown in Table 1.

TABLE 1

Raw material preparation formulation of nano-modifier

| Modifier composition | Raw material preparation formulation (g) | | | | Content of final component(%) | | | |
|---|---|---|---|---|---|---|---|---|
| | TEOS | EVA emulsion | Polyvinyl alcohol | (Poly Acrylic Acid (PAA) copolymer emulsion | Silicon dioxide | EVA dry glue | polyvinyl alcohol | PAA coplymer dry glue |
| NS-1 | 60 | 120 | 3 | 20 | 19.2 | 66.4 | 3.3 | 11.1 |
| NS-2 | 30 | 120 | 2 | 10 | 10.6 | 73.5 | 3.7 | 12.2 |
| NS-3 | 140 | 120 | 3 | 15 | 36.4 | 54.1 | 2.7 | 6.8 |
| NS-4 | 90 | 120 | 2 | 15 | 27.1 | 62.9 | 2.1 | 7.9 |
| NS-5 | 208 | 120 | 2 | 10 | 47.2 | 47.2 | 1.6 | 3.9 |

The processing aid is the mixture of nano-silicon dioxide, polyvinyl alcohol, (meth) acrylic copolymer and EVA copolymer, and the preparation process thereof is as follows.

Preparation of NS-1 nano-modified composition: adding 50 g deionized water and 3 g polyvinyl alcohol of which the degree of polymerization is 1500-2000, and the alcoholysis degree is greater than or equal to 98% into the reaction kettle, heating up to 95 degrees centigrade and implementing thermal insulation for 3 hr to guarantee that the polyvinyl alcohol is completely dissolved; after cooling to 55 degrees centigrade, sequentially adding 20 g butyl acrylate-methacrylic acid copolymer emulsion (PAA copolymer for short, of which the molar content of methacrylic acid is 15%), of which the solid content is 50%, and the degree of polymerization is between 150 and 200, 120 g EVA copolymer emulsion (the VA content is 75%), of which the solid content is 50%, and 10 ml hydrochloric acid of which the concentration is 0.1 M; after uniformly mixing, dropping 60 g TEOS within 30 min, and then keeping at 55 degrees centigrade for 6 hr; drying and granulating the products to obtain the NS-1 nano-modified composition.

Preparation of NS-2 nano-modified composition: adding 50 g deionized water and 2 g polyvinyl alcohol of which the degree of polymerization is 1500-2000, and the alcoholysis degree is greater than or equal to 98% into the reaction kettle, heating up to 95 degrees centigrade and implementing thermal insulation for 3 hr to guarantee that the polyvinyl alcohol is completely dissolved; after cooling to 55 degrees centigrade, sequentially adding 10 g ethyl methacrylate-sodium methacrylate salt copolymer emulsion (the molar content of the sodium methacrylate is 10%), of which the solid content is 50%, and the degree of polymerization is between 150 and 200, 120 g EVA copolymer emulsion (the VA content is 75%), of which the solid content is 50%, and 10 ml hydrochloric acid of which the concentration is 0.1M; after uniformly mixing, dropping 30 g TEOS within 30 min, and then keeping at 55 degrees centigrade for 6 hr; drying and granulating the products to obtain the NS-2 nano-modified composition.

Preparation of NS-3 nano-modified composition: adopting 15 g methacrylic acid-2-ethyl hexyl ester-methacrylic acid copolymer emulsion (the molar content of sodium methacrylate is 25%), of which the solid content is 50%, and the degree of polymerization is between 150 and 200, and 140 g TEOS; the other conditions are the same with the preparation process of NS-1.

Preparation of NS-4 nano-modified composition: adopting 15 g methyl methacrylate-acrylic acid copolymer emulsion (the molar content of acrylic acid is 25%), of which the solid content is 50%, and the degree of polymerization is between 150 and 200, and 90 g TEOS; the other conditions are the same with the preparation process of NS-2.

Preparation of NS-5 nano-modified composition: adopting 10 g ethyl methacrylate-methacrylic acid copolymer emulsion (the molar content of acrylic acid is 10%), of which the solid content is 50%, and the degree of polymerization is between 150 and 200, and 208 g TEOS; the other conditions are the same with the preparation process of NS-2.

Melting and blending the NS-1 and the LDPE resins for flexible packaging which have different proportions at 190 degrees centigrade, the blending formulations are shown in Table 2.

TABLE 2

Modification formulation of LDPE
Composition of NS-1 modified LDPE (g)

| No. | NS-1 | 1010 | 168 | ZnSt | LDPE |
|---|---|---|---|---|---|
| Comparative example 1 | 0 | 3 | 3 | 2 | 3000 |
| Embodiment 1 | 15 | 3 | 3 | 2 | 3000 |
| Embodiment 2 | 30 | 3 | 3 | 2 | 3000 |
| Embodiment 3 | 90 | 3 | 3 | 2 | 3000 |
| Embodiment 4 | 150 | 3 | 3 | 2 | 3000 |

Blowing the comparative example 1 which adds no nano-modifier and the embodiments 1 to 4 which add different proportions of modifiers to be the flexible packaging films, using a Differential Scanning calorimetry (DSC) method to measure the crystallinity of the films, and the crystallinity of the film is shown in Table 3.

TABLE 3

Crystallinity of NS-1 modified LDPE

| No. | Content of NS-1/wt % | Melting enthalpy/J/g | Crystallinity/% |
|---|---|---|---|
| Comparative example 1 | 0 | 58.24 | 20.31 |
| Embodiment 1 | 0.5 | 70.21 | 24.49 |
| Embodiment 2 | 1.0 | 72.50 | 25.28 |
| Embodiment 3 | 3.0 | 72.51 | 25.29 |
| Embodiment 4 | 5.0 | 65.61 | 22.88 |

The detection method of the solvent residue value of the film is as follows: placing the produced film into a dryer at 60 degrees centigrade to dry for 2 hr, taking out and cooling in a dryer, and then placing on a one-ten-thousandth balance for weighing, recording as $W_1$, dropping toluene or ethyl acetate on four different locations of one side of the film, and then recording the reading number $W_2$ of the balance every 1 min until reaching constant weight. ($W_1$-$W_2$) can represent the relative amount of the toluene or ethyl acetate residues.

It can see from the comparative example 1 that, as the selected LDPE resin has many branch chains, it has low crystallization capacity, and has only about 20% of crystallinity; after adding the NS-1 nano-modifier composition, the crystallinity of the resin is increased to 25%. The increase of the crystallinity and polarity can make the toluene residues of the nano-modified films be decreased by more than 50% (as shown in Table 4); the toluene residue in the embodiment 4 is decreased to be 0; the residue of ethyl acetate in the embodiments 1 to 4 is decreased by more than 60%.

TABLE 4

Organic solvent residue of NS-1 modified LDPE

| Sample No. | Content of NS-1 modifier wt % | Toluene residue mg | Ethyl acetate residue mg |
|---|---|---|---|
| Comparative example 1 | 0 | 3.1 | 1.1 |
| Embodiment 1 | 0.5 | 0.2 | 0.3 |
| Embodiment 2 | 1.0 | 0.1 | 0.4 |
| Embodiment 3 | 3.0 | 1.6 | 0.1 |
| Embodiment 4 | 5.0 | 0 | 0.1 |

Similarly, adding the NS-2 nano-modifier additives into common PP resin for flexible packaging, and then casting to be the CPP film, adopting the DSC method to measure the crystallinities of the CPP films in the comparative example 2 and the embodiments 5 to 8; the results are shown in Table 5.

TABLE 5

Crystallinity of CPP film obtained by NS-2 via modification

| No. | Content of NS-2/wt % | Melting enthalpy/J/g | Crystallinity/% |
|---|---|---|---|
| Comparative example 2 | 0 | 154.8 | 93.80 |
| Embodiment 5 | 0.5 | 94.9 | 57.51 |
| Embodiment 6 | 1.0 | 103.9 | 63.00 |
| Embodiment 7 | 3.0 | 90.2 | 65.67 |
| Embodiment 8 | 5.0 | 88.4 | 53.58 |

The selected PP raw material has relatively high crystallization capacity, the crystallinity of the unmodified CPP film in the comparative example 2 reaches 93.80%, so, the heterogeneous nucleation performance of the nano-silicon dioxide is not acted obviously, but the barrier property to the rearrangement of PP molecular chains acted by the EVA in the modifier is obvious, which makes the crystallinities in the embodiments 5-8 be decreased in different degrees.

In spite of this, the organic solvent residues in the modified CPP are still obviously decreased. Dropping 4 drops of toluene or ethyl acetate on the CPP film, and then recording the increase value of the film weight–the weight of the toluene or ethyl acetate absorbed by the film every 1 min, the results are shown in Table 6 and Table 7.

TABLE 6 toluene residue of NS-2 modified CPP film

| Sample No. | NS-2 content wt % | Detection time/min Solvent residue/mg | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 15 |
| Comparative example 2 | 0 | 27.9 | 21.8 | 17.0 | 12.8 | 9.6 | 6.9 | 4.8 | 3.4 | 2.5 | 1.9 | 1.6 | 1.5 | 1.5 | 1.5 | 1.5 |
| Embodiment 5 | 0.5 | 18.1 | 13.6 | 9.6 | 6.5 | 4.1 | 2.3 | 1.1 | 0.7 | 0.4 | 0.4 | 0.4 | 0.4 | 0.4 | 0.4 | 0.4 |
| embodiment 6 | 1.0 | 34.7 | 25.7 | 19.6 | 14.7 | 10.9 | 7.9 | 5.8 | 4.4 | 3.3 | 2.4 | 1.8 | 1.3 | 0.9 | 0.6 | 0.6 |
| Embodiment 7 | 3.0 | 42.3 | 29.7 | 19.3 | 13.1 | 9.2 | 6.8 | 5.1 | 3.7 | 2.9 | 2.4 | 2.3 | 2.2 | 2.1 | 2.0 | 2.0 |
| Embodiment 8 | 5.0 | 45.8 | 34.4 | 25.5 | 18.0 | 13.1 | 9.5 | 7.0 | 5.1 | 4.3 | 3.0 | 2.5 | 2.3 | 2.1 | 1.9 | 1.9 |

When the toluene stays on the CPP film for 12 min, the adsorption-desorption to the toluene acted by the film is balanced; and now, the toluene residue in the comparative example 2 is 1.5 mg (as shown in Table 6); when the content of the nano-modification aid reaches 0.5-1.0%, the toluene residue of the modified CPP film is reduced to 0.4-0.6 mg; when continuously increasing the dosage of aids, for the embodiments 7 to 8, as the EVA in the modifier has impediment effect to the CPP recrystallization, the proportion of the amorphous regions of the film is increased, the solubility of the toluene in the CPP is increased to make the toluene residue of the modified CPP film be increased.

The ethyl acetate is easy to volatilize on the CPP film, and has a short residence time due to relatively low boiling point, namely, the ethyl acetate has a short diffusion time in the amorphous regions of the CPP films, so that the solubility of the ethyl acetate in the amorphous regions of the CPP cannot be greatly increased; thus, the ethyl acetate residue cannot be greatly affected by the crystallinity, but can be obviously affected by the polarity. Data in Table 7 shows that the adsorption-desorption balance can be reached when the ethyl acetate stays on the surface of the CPP film for about 4 min, which is one third of the adsorption-desorption balancing time of the toluene on the CPP film; the ethyl acetate cannot be fully diffused to the amorphous regions of the CPP films within such short time, therefore, the influence of the crystallinity on the ethyl acetate residue cannot be shown. The ethyl acetate residue of the unmodified CPP film is 0.5 mg, when the additive amount of the nano-modified additive is 0.5-1.0%, the ethyl acetate residue of the modified CPP film is decreased to 0.2 mg; when continuously increasing the dosage of the nano-modified additive, the ethyl acetate residue of the modified CPP films in the embodiments 7 to 8 is decreased to be 0.

TABLE 7

Ethyl acetate residue of NS-2 modified CPP film

| Sample No. | NS-2 content wt % | Detection time/min |||||||||||||||
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 15 |
| | | Solvent residue/mg ||||||||||||||||
| Comparative example 2 | 0 | 25.1 | 13.6 | 6.9 | 2.5 | 0.5 | 0.5 | 0.5 | 0.5 | 0.5 | 0.5 | 0.5 | 0.5 | 0.5 | 0.5 | 0.5 |
| Embodiment 5 | 0.5 | 21.4 | 11.6 | 5.3 | 1.5 | 0.2 | 0.2 | 0.2 | 0.2 | 0.2 | 0.2 | 0.2 | 0.2 | 0.2 | 0.2 | 0.2 |
| Embodiment 6 | 1.0 | 22.6 | 11.5 | 4.0 | 0.7 | 0.2 | 0.2 | 0.2 | 0.2 | 0.2 | 0.2 | 0.2 | 0.2 | 0.2 | 0.2 | 0.2 |
| embodiment 7 | 3.0 | 14.9 | 5.8 | 1.1 | 0 | 0 | 0 | 0 | 0 | 0 | 0 | 0 | 0 | 0 | 0 | 0 |
| embodiment 8 | 5.0 | 19.4 | 8.0 | 2.4 | 0 | 0 | 0 | 0 | 0 | 0 | 0 | 0 | 0 | 0 | 0 | 0 |

Taking the PP with high crystallization capacity which is used in the embodiment 2 as the starting raw material, adding the NS-3 nano-modifier to the PP resin, and then casting to be the PP film (CPP). Adopting the DSC method to measure the crystallinity of the CPP films in the comparative example 2 and the embodiments 9 to 12; the results are shown in Table 8.

TABLE 8

Crystallinity of CPP film modified by NS-3

| No. | Content of NS-3/wt % | Melting enthalpy/J/g | Crystallinity/% |
|---|---|---|---|
| Comparative example 2 | 0 | 154.8 | 93.80 |
| Embodiment 9 | 0.5 | 144.9 | 87.81 |
| Embodiment 10 | 1.0 | 132.9 | 80.54 |
| Embodiment 11 | 3.0 | 120.2 | 72.85 |
| Embodiment 12 | 5.0 | 118.4 | 71.75 |

As the content of EVA of the nano-modified aid NS-3 is lower than that of NS-1 and NS-2, when the additive amount of the nano-aid is relatively high, the influence of the EVA on the crystallinity is smaller than NS-1 and NS-2. The data in Table 7 shows that the crystallinity of the modified CPP in embodiment 12 is 71.75%, which is reduced by 22% by comparing with the embodiment 2.

Measuring the influence of NS-3 nano-modifier to the solvent residue of CPP film, and the results are shown in Table 9. The adsorption-desorption balancing time of the toluene solvent on the modified CPP film is shorter than NS-2, which is about 8 min, and the toluene residue is singly reduced along with the increase of the additive amount of the NS-3 modified additive, the ethyl acetate is the same.

TABLE 9

Organic solvent residue of NS-3 modified CPP film

| Sample No. | Content of NS-3 modifier wt % | Toluene residue mg | Ethyl acetate residue mg |
|---|---|---|---|
| Comparative example 2 | 0 | 1.5 | 0.5 |
| Embodiment 9 | 0.5 | 0.2 | 0.1 |
| Embodiment 10 | 1.0 | 0.1 | 0 |
| Embodiment 11 | 3.0 | 0 | 0 |
| Embodiment 12 | 5.0 | 0 | 0 |

Using the NS-4 nano composition to modify a PP of which the initial crystallization capacity is 51.8%, wherein the PP has relatively high molecular weight, large melt viscosity, high rearrangement resistance of molecular chains, thus causing poor crystallization capacity. The NS-4 nano composition has excellent heterogeneous nucleation effect to the polypropylene, can promote the crystallization of the polypropylene, and can greatly improve the crystallinity; meanwhile, the polar groups in the composition can improve the solubility parameter of the modified polypropylene, thus, the toluene residue value and ethyl acetate residue value of the modified PP are both greatly decreased (as shown in Table 10).

TABLE 10

Crystallinity of CPP film modified by NS-4

| No. | Content of NS-4/wt % | Melting enthalpy/J/g | Crystallinity/% | Toluene residue mg | Ethyl acetate residue mg |
|---|---|---|---|---|---|
| Comparative example 3 | 0 | 85.4 | 51.8 | 5.7 | 1.4 |
| Embodiment 13 | 0.5 | 104 | 63.0 | 0.5 | 0 |
| Embodiment 14 | 1.0 | 88.1 | 53.4 | 0 | 0 |
| Embodiment 15 | 3.0 | 87.0 | 52.7 | 0 | 0 |
| Embodiment 16 | 5.0 | 88.2 | 53.5 | 0.3 | 0 |

The NS-5 modifier composition with relatively high silicon dioxide concentration can obviously improve the crystallization capacity of the polypropylene; in the case of 0.5% of additive amount, the crystallinity of the PP with poor crystallization capacity can be improved by more than 30% (as shown in Table 11); the polar particles and polar groups with high content can make the organic solvent residue value of the modified PP film be fast reduced.

TABLE 11

Crystallinity of CPP film modified by NS-5

| No. | Content of NS-5/wt % | Melting enthalpy/J/g | Crystallinity/% | Toluene residue mg | Ethyl acetate residue mg |
|---|---|---|---|---|---|
| Comparative example 3 | 0 | 85.4 | 51.8 | 5.7 | 1.4 |
| Embodiment 13 | 0.5 | 116.6 | 70.7 | 0 | 0 |
| Embodiment 14 | 1.0 | 96.2 | 58.3 | 0 | 0 |
| Embodiment 15 | 3.0 | 102.2 | 61.9 | 0 | 0 |
| Embodiment 16 | 5.0 | 98.3 | 59.6 | 0.1 | 0 |

As the dispersibility of the nano materials in the polyolefin is relative to the processing conditions, the organic solvent residue values of the modified films obtained in the case of 5% of additive amount are not certainly smaller than that in the case of smaller additive amount, because the diffusion effect of the nano composition under high additive amount can be decreased.

In order to further verify the effect of the nano modifier for reducing the solvent residues of the packaging materials, the inventor adds the NS-1-NS-5 nano-silicon dioxide compositions prepared by the disclosure and the NS-0 nano-silicon dioxide composition which is prepared by the precipitation method, and of which the publication number is CN101724176A into the PP resins, the additive amounts of all the nano compositions are all 1.0%; using the modified PP resin as raw materials to produce the modified BOPP film on the industrial BOPP production line, and then using an AIC2-5 type printability tester to print on the BOPP film in the case of 650N of pressure, 21-25 degrees centigrade of temperature, 0.2 m/s of printing speed, and 50% of relative humidity, adopting the chlorinated PP type ink as the ink, and adopting toluene, ethyl acetate and the like as the mixed solvent; drying 24 hr under room temperature after printing, measuring the total solvent residue value and the benzene solvent residue value of the printed BOPP films, and comparing with the unmodified BOPP films, the results are shown in Table 12: compared with the unmodified films, the total solvent residue of the nano-modified PP film after printing is reduced by more than 40%; and the effect of reducing the solvent residues by the NS-1 to NS-5 nano compositions prepared by the disclosure is more obvious than that of the NS-0.

TABLE 12

Solvent residue of nano-modified BOPP films after printing

| No. | Content of modifier/ wt % | Toluene residue mg/m2 | Total solvent residue mg/m2 |
|---|---|---|---|
| NS-1 modified BOPP film | 1.0 | 0.09 | 0.27 |
| NS-2 modified BOPP film | 1.0 | 0.10 | 0.35 |
| NS-3 modified BOPP film | 1.0 | 0.03 | 0.21 |
| NS-4 modified BOPP film | 1.0 | 0.05 | 0.23 |
| NS-5 modified BOPP film | 1.0 | 0.02 | 0.14 |
| NS-0 modified BOPP film | 1.0 | 0.12 | 0.60 |
| Unmodified BOPP film | 0 | 0.22 | 1.14 |

Testing the solvent residue of the LDPE film after printing by the same method, the results are shown in Table 13; compared with the unmodified LDPE films, the solvent residue indicators of the LDPE modified by the NS-0 nano-silicon dioxide composition and the LDPE film modified by NS-1 to NS-5 have very low solvent residues; and the nano-modified composition NS-1 to NS-5 of the disclosure has more obvious effect of reducing the residues of solvent in the packaging films.

TABLE 13

Solvent residue of nano-modified LDPE films after printing

| No. | Content of modifier/ wt % | Toluene residue mg/m$^2$ | Total solvent residue mg/m$^2$ |
|---|---|---|---|
| NS-1 modified LDPE film | 1.0 | 0.05 | 0.10 |
| NS-2 modified LDPE film | 1.0 | 0.04 | 0.10 |
| NS-3 modified LDPE film | 1.0 | 0.02 | 0.08 |
| NS-4 modified LDPE film | 1.0 | 0.03 | 0.08 |
| NS-5 modified LDPE film | 1.0 | 0.02 | 0.07 |
| NS-0 modified LDPE film | 1.0 | 0.08 | 0.22 |
| unmodified LDPE film | 0 | 0.16 | 0.54 |

From the above results, it can see that the solvent residues of the common PE or PP resins when being used as the flexible packaging materials can be reduced by implementing nano modification; the packaging materials which can better satisfy the food safety can be prepared; the nano-modification process becomes a new route of preparing the flexible packaging materials with low solvent residues.

The data in Table 12 and Table 13 show that, the polyvinyl alcohol, acrylic copolymers and the nano-silicon dioxide have the effect of synergistic enhancement; in the case of having same additive amount, the solvent residues of the flexible packaging materials can be obviously decreased. In other words, the additive amount of the modified composition of the disclosure can be smaller in order to achieve the same solvent residue reducing effect.

Those skilled in the art should know that, the above preferred embodiments are only the detailed descriptions of the disclosure, without improperly limiting the disclosure. The disclosure can have various modifications, combinations, sub-combinations and changes based on demands; and all the modifications, combinations, sub-combinations, changes and equivalent replacements shall fall within the range of the attached claims.

What is claimed is:

1. A polyolefin composition, comprising:
   a polyolefin resin;
   a modifier composition comprising,
      a nano-silicon dioxide, present in an amount of about 10 to about 50 parts by weight of said modifier composition;
      a polyvinyl alcohol, present in an amount of about 1 to about 5 parts by weight of said modifier composition;
      an acrylic copolymer, present in an amount of about 2 to about 15 parts by weight of said modifier composition; and
      an ethylene-vinyl acetate (EVA) copolymer, present in an amount of about 45 to about 75 parts by weight of said modifier composition.

2. The polyolefin composition according to claim 1, comprising:
   nano-silicon dioxide, which is 15-50 parts by weight of said modifier composition;
   polyvinyl alcohol, which is 1.5-5 parts by weight of said modifier composition;
   acrylic copolymer, which is 3-15 parts by weight of said modifier composition; and
   EVA copolymer, which is 45-74 parts by weight of said modifier composition.

3. The modifier composition according to claim 2, comprising:
   nano-silicon dioxide, which is 19-50 parts by weight of said modifier composition
   polyvinyl alcohol, which is 1.5-4 parts by weight of said modifier composition;
   acrylic copolymer which is 3.9-15 parts by weight of said modifier composition; and ethylene-vinyl acetate (EVA) copolymer, which is 47-73.5 parts by weight of said modifier composition.

4. The polyolefin composition according to claim 1, wherein, the degree of polymerization of the polyvinyl alcohol is 1500-2000, and the alcoholysis degree of the polyvinyl alcohol is greater than or equal to 98%.

5. The polyolefin composition according to claim 1, wherein, the content of vinyl acetate in the EVA copolymer is 70%-95% by weight.

6. The polyolefin composition according to claim 1, wherein, the acrylic copolymer is a copolymer of (meth) acrylic ester and (meth) acrylic acid and/or (meth) acrylic salt.

7. The polyolefin composition according to claim 6, wherein, the degree of polymerization of the acrylic copolymer is 150-200, and the monomer molar content of the (meth) acrylic acid and/or (meth) acrylic salt is 10%-30%.

8. The polyolefin composition according to claim 6, wherein, the (meth) acrylic ester is (meth) acrylic acid alkyl ester.

9. The polyolefin composition according to claim 8, wherein, (meth) acrylic acid alkyl ester is (meth) acrylic acid $C_{1-15}$ alkyl ester.

10. The polyolefin composition according to claim 6, wherein, the (meth) acrylic ester is selected from one or the mixture of at least two of: methyl acrylate, ethyl acrylate, propyl acrylate, butyl acrylate, pentyl acrylate, hexyl acrylate, acrylate-2-ethyl hexyl ester, methyl methacrylate, ethyl methacrylate, propyl methacrylate, butyl methacrylate, pentyl methacrylate, hexyl methacrylate, or methacrylate-2-ethyl hexyl ester.

11. The polyolefin composition according to claim 6, wherein, the (meth) acrylic acid and/or (meth) acrylic salt is/are selected from acrylic acid, methacrylic acid or the salts thereof, or the mixture of at least two thereof.

12. The polyolefin composition according to claim 1, wherein, the polyolefin resin is selected from polyethylene (PE), polypropylene (PP) and blends of PE and PP.

13. The polyolefin composition according to claim 12, wherein, the PE is selected from high density PE (HDPE) and low density PE (LDPE).

14. The polyolefin composition according to claim 1, wherein, in each 100 parts of the polyolefin resin by weight, the additive amount of the modifier composition of the polyolefin is 0.5-5 parts by weight.

15. The polyolefin composition according to claim 1, wherein, when the crystallinity of the polyolefin resin is greater than or equal to 90%, in each 100 parts of the polyolefin resin by weight, the dosage of the modifier composition of the polyolefin is 0.5-1.0 part by weight.

16. A flexible packaging film comprising:
an upper layer;
at least one core layer;
a lower layer;
wherein said upper layer and said lower layer comprise a polyolefin composition, said polyolefin composition comprising:
a polyolefin resin;
a modifier composition comprising,
a nano-silicon dioxide, present in an amount of about 10 to about 50 parts by weight of said modifier composition;
a polyvinyl alcohol, present in an amount of about 1 to about 5 parts by weight of said modifier composition;
an acrylic copolymer, present in an amount of about 2 to about 15 parts by weight of said modifier composition; and
an ethylene-vinyl acetate (EVA) copolymer, present in an amount of about 45 to about 75 parts by weight of said modifier composition.

17. The flexible packaging film according to claim 16, wherein said core layer is selected from the group consisting of a Biaxially Oriented PP (BOPP) film and a Casting PP (CPP) film and said polyolefin resin of said upper and lower layers is polyethylene.

* * * * *